United States Patent Office 2,702,803
Patented Feb. 22, 1955

2,702,803

SUBSTITUTED HETERODIAZOLES

Cameron Ainsworth, Indianapolis, Ind., assignor to Eli Lilly and Company, Indianapolis, Ind., a corporation of Indiana No Drawing. Application April 12, 1954,
Serial No. 422,681

3 Claims. (Cl. 260—302)

This invention relates to heterocyclic organic compounds and more particularly to certain new 1-hetero-2-phenyl-3,4-diazoles.

The new compounds can be represented by the formula:

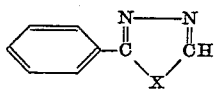

wherein X represents an oxygen or a sulfur atom.

The new compounds are somewhat water soluble, relatively low-melting solid substances which are soluble in the common organic solvents. When administered orally to animals in doses of an amount of about 5 to 20 milligrams per kilogram of body weight they have useful sedative and hypnotic action.

The new phenyl substituted heterodiazoles can be prepared by condensing an acid hydrazide prepared from benzoic acid, or the sulfur analogue thereof, with an ortho ester. The reaction is illustratde by the following equation showing the preparation of 2-phenyl-1,3,4-oxadiazole.

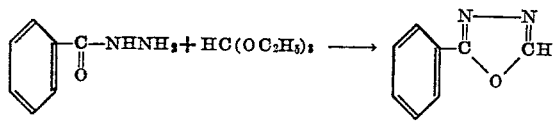

The ortho ester which is used can be any commonly available ester of this type such as, for example, ethyl orthoformate, methyl orthoformate and the like. An excesss of the ortho ester is conveniently used to eliminate the requirement for a solvent, although, if desired, an inert solvent such as benzene, ethanol and the like can be used. The reaction can readily be carried to completion by heating the reaction mixture at reflux temperature for several hours. The reaction products are isolated and purified, as by evaporating the excess of ortho ester or other solvent, and subjecting the residue of the heterodiazole to distillation under reduced pressures.

The following examples illustrate the preparation of the new compounds.

*Example 1*

A solution of 30 g. of benzoyl hydrazine and 200 ml. of ethyl orthoformate was heated to refluxing during about 15 hours. The excess of ethyl orthoformate was then removed by evaporation in vacuo, and the residue comprising 2-phenyl-1,3,4-oxadiazole was purified by distillation under reduced pressure. The 2-phenyl-1,3,4-oxadiazole thus prepared was a colorless oil which boiled at about 125° C. at a pressure of 5 mm. of mercury. On standing, the substance solidified in crystalline form. The solid 2-phenyl-1,3,4-oxadiazole melted at about 34° C.

*Example 2*

A mixture of 2 g. of thionobenzhydrazide and 10 g. of ethyl orthoformate was heated to refluxing during about 24 hours. The excess of ethyl orthoformate was removed by evaporation in vacuo, and the residue was distilled under reduced pressure. The 2-phenyl-1,3,4-thiadiazole formed in the reaction boiled at about 115° C. at a pressure of 0.1 mm. of mercury. Upon standing, it solidified, yielding a crystalline solid, which melted at about 40° C.

The process for the preparation of the heterodiazoles of this invention is disclosed and claimed in my copending application Serial Number 422,682, filed on even date herewith.

I claim:

1. A compound represented by the formula:

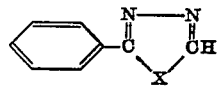

wherein X represents a member of the group consisting of oxygen and sulfur atoms.

2. 2-phenyl-1,3,4-oxadiazole.

3. 2-phenyl-1,3,4-thiadiazole.

No references cited.